US010401178B2

(12) United States Patent
Jantunen et al.

(10) Patent No.: US 10,401,178 B2
(45) Date of Patent: Sep. 3, 2019

(54) CAUSING A TRANSITION BETWEEN POSITIONING MODES

(71) Applicant: Nokia Technologies Oy, Espoo (FI)

(72) Inventors: Joni Jantunen, Helsinki (FI); Veli-Matti Kolmonen, Espoo (FI); Oskari Koskimies, Helsinki (FI); Ilari Teikari, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/760,893

(22) PCT Filed: Sep. 22, 2015

(86) PCT No.: PCT/FI2015/050630
§ 371 (c)(1),
(2) Date: Mar. 16, 2018

(87) PCT Pub. No.: WO2017/051060
PCT Pub. Date: Mar. 30, 2017

(65) Prior Publication Data
US 2018/0252533 A1 Sep. 6, 2018

(51) Int. Cl.
*G01C 21/20* (2006.01)
*G01S 3/02* (2006.01)
(Continued)

(52) U.S. Cl.
CPC .......... *G01C 21/206* (2013.01); *G01C 21/20* (2013.01); *G01S 3/02* (2013.01); *G01S 3/046* (2013.01);
(Continued)

(58) Field of Classification Search
CPC .................................................. G01C 21/206
(Continued)

(56) References Cited

U.S. PATENT DOCUMENTS 8,284,100 B2 10/2012 Vartanian et al.
8,930,134 B2 1/2015 Gu et al.
(Continued)

FOREIGN PATENT DOCUMENTS

JP 2009-085780 4/2009
JP 2015-102510 6/2015
(Continued)

OTHER PUBLICATIONS

"Bluetooth Core Specification Version 4.2", Specification of the Bluetooth system, Dec. 2, 2014, 2772 pages.
(Continued)

*Primary Examiner* — Joel Ajayi
(74) *Attorney, Agent, or Firm* — Locke Lord LLP

(57) ABSTRACT

This specification describes a method comprising causing a trackable device to transition between a first positioning mode and a second positioning mode, wherein, in the first positioning mode, the trackable device causes wireless transmission of one or more data packets each including a data portion for enabling determination of a bearing between the trackable device and a locator device and, in the second positioning mode, the trackable device causes wireless transmission of one or more data packets which do not include the data portion for enabling determination of the bearing between the trackable device and the locator device.

13 Claims, 3 Drawing Sheets

Operate (or continue operating) in current positioning mode S2.1
Device-initiated transition required? S2.2
No
Yes
Control packet(s) received? S2.3
Transition between positioning modes S2.4
Operate in positioning mode to which transition was made (and modify transmission frequency if applicable) S2.5
Transition to other positioning mode? S2.6
Modify reception slot interval? S2.7
Modify reception slot interval S2.8
Disable device-initiated transition functionality? S2.9
Disable device-initiated transition functionality S2.10
Enable device-initiated transition functionality? S2.11
Enable local transition functionality S2.12

(51) Int. Cl.

| | |
|---|---|
| ***G01S 5/02*** | (2010.01) |
| ***H04W 4/02*** | (2018.01) |
| ***H04W 64/00*** | (2009.01) |
| ***G01S 3/04*** | (2006.01) |
| ***G01S 13/86*** | (2006.01) |

(52) U.S. Cl.
CPC ................ *G01S 5/02* (2013.01); *G01S 13/86* (2013.01); *H04W 4/02* (2013.01); *H04W 64/00* (2013.01)

(58) Field of Classification Search
USPC ........................................................ 455/456.3
See application file for complete search history.

(56) References Cited

U.S. PATENT DOCUMENTS

| | | | | |
|---|---|---|---|---|
| 2006/0038676 | A1 * | 2/2006 | Richards ............ | G08B 21/0227 340/539.23 |
| 2006/0217132 | A1 | 9/2006 | Drummond-Murray et al. | |
| 2007/0205886 | A1 | 9/2007 | Huseth et al. | |
| 2010/0302102 | A1 | 12/2010 | Desai et al. | |
| 2011/0140967 | A1 * | 6/2011 | Lopez Pou .......... | A01K 11/008 342/450 |
| 2012/0257604 | A1 | 10/2012 | Honkanen et al. | |
| 2013/0188538 | A1 | 7/2013 | Kainulainen et al. | |
| 2015/0087331 | A1 | 3/2015 | Yang et al. | |

FOREIGN PATENT DOCUMENTS

| | | | |
|---|---|---|---|
| WO | 2006/086398 | A2 | 8/2006 |
| WO | 2012/152988 | A1 | 11/2012 |
| WO | 2013/179195 | A1 | 12/2013 |
| WO | 2014/087196 | A1 | 6/2014 |
| WO | 2014/087197 | A1 | 6/2014 |
| WO | 2014/087198 | A1 | 6/2014 |
| WO | 2014/087199 | A1 | 6/2014 |
| WO | 2014/107869 | A1 | 7/2014 |
| WO | 2014/108753 | A1 | 7/2014 |
| WO | 2014/113882 | A1 | 7/2014 |
| WO | 2015/013904 | A1 | 2/2015 |
| WO | 2017/013304 | A1 | 1/2017 |
| WO | 2017/037325 | A1 | 3/2017 |

OTHER PUBLICATIONS

Puussaar, "Indoor Positioning Using WLAN Fingerprinting with Post-Processing Scheme", Master Thesis, 2014, pp. 1-76.

"How do iBeacons work?", Warski, Retrieved on Mar. 13, 2018, Webpage available at : http://www.warski.org/blog/2014/01/how-ibeacons-work/.

Chawathe, "Low-Latency Indoor Localization Using Bluetooth Beacons", 12th International IEEE Conference on Intelligent Transportation Systems, Oct. 3-7, 2009, pp. 467-473.

Tian et al., "Received Signal Strength Indicator-Based Adaptive Localization Algorithm for Indoor Wireless Sensor Networks", Sensors & Transducers, vol. 22, Special Issue, Jun. 2013, pp. 1-7.

"How iBeacons Work for Indoor Location Based Services—Technical Guide and Recommendations", The Center for Digital Intelligence™ @Regalix, Retrieved on Mar. 13, 2018, Webpage available at :http://mobileenterprisestrategies.blogspot.in/2014/05/how ibeacons-work-for-indoor-location.html.

Yuan et al., "Study of WLAN Fingerprinting Indoor Positioning Technology based on Smart Phone", International Conference on Information Sciences, Machinery, Materials and Energy, 2015, pp. 987-993.

"Bluetooth Low Energy Solution Released", Indoo.rs, Retrieved on Mar. 13, 2018, Webpage available at : https://Indoo.rs/bluetooth-low-energy-solution-released/.

Zhang et al., "DV-Hop Based Self-Adaptive Positioning in Wireless Sensor Networks", 5th International Conference on Wireless Communications, Networking and Mobile Computing, Sep. 24-26, 2009, pp. 1-4.

Deng et al., "Cost Function of Features Based Mode Switching Algorithm for Indoor Positioning", 5th International Conference on Wireless Communications, Networking and Mobile Computing, Sep. 24-26, 2009, pp. 1-4.

International Search Report and Written Opinion received for corresponding Patent Cooperation Treaty Application No. PCT/FI2015/050630, dated Jan. 19, 2016, 12 pages.

Extended European Search Report for European Patent Application No. 15904684.6 dated Apr. 26, 2019, 8 pages.

Demigha, O., Et Al., "On Energy Efficiency in Collaborative Target Tracking in Wireless Sensor Network: A Review", IEEE Communications Surveys & Tutorials, vol. 15, No. 3, Third Quarter 2013, pp. 1210-1222.

English Language Machine Translation of Japanese Patent Publication No. JP2009-085780 dated Apr. 23, 2009, 54 pages.

English Language Machine Translation of Japanese Patent Publication No. JP2015-102510 dated Jun. 4, 2015, 44 pages.

* cited by examiner

CAUSING A TRANSITION BETWEEN POSITIONING MODES

RELATED APPLICATION

This application was originally filed as PCT Application No. PCT/FI2015/050630 filed Sep. 22, 2015.

FIELD

This specification relates to causing a transition between positioning modes and, more specifically, to causing a trackable device to transition between a first positioning mode and a second positioning mode.

BACKGROUND

There are many different types of indoor positioning systems for enabling the determination of the position of trackable wireless devices within an indoor space. Some of these are already implemented while others are still under development. Such systems include Nokia's High Accuracy Indoor Positioning (HAIP) system which is configured to track the position of trackable devices using locator devices which utilise phased antenna arrays to determine a bearing between the trackable device and the locator device based on radio frequency (RF) data packets received at the locator device. This system is highly accurate and can provide accuracy of better than 30 centimeters. There are other systems, which may be referred to as cost-optimised indoor positioning (COIP) systems, which provide less accurate positioning but use less computational resources (e.g. electricity, processing power and bandwidth). These systems may utilise the signal strength of incoming data packets to provide room-level accuracy or, if a sufficient number of COIP locator devices are provided within a particular space, may utilise the signal strength in addition to fingerprinting (radio-maps) to provide an accuracy of approximately 2 meters.

SUMMARY

In a first aspect, this specification describes a method comprising causing a trackable device to transition between a first positioning mode and a second positioning mode, wherein, in the first positioning mode, the trackable device causes wireless transmission of one or more data packets each including a data portion for enabling determination of a bearing between the trackable device and a locator device and, in the second positioning mode, the trackable device causes wireless transmission of one or more data packets which do not include the data portion for enabling determination of the bearing between the trackable device and the locator device.

In some examples, data packets may be transmitted by the trackable device with a higher frequency when in the first positioning mode than when in the second positioning mode.

The method may further comprise causing the transition between the first and second positioning modes in response to wireless receipt by the trackable device of a mode-transition control packet or a determination based on data that is locally available to the trackable device. The method may further comprise causing the transition between the first and second positioning modes in response to receipt of the mode-transition control packet. The method may further comprise modifying an interval between transmissions of packets by the trackable device in response to receipt of the mode-transition control packet or in response to wireless receipt at the trackable device of a transmission-frequency control packet. The mode-transition control packet or the transmission-frequency control packet may indicate the interval to which the interval between transmissions should be modified.

The method may comprise, prior to causing the transition between the first and second positioning modes, responding to receipt of a reception-frequency control packet by modifying an interval between reception time slots during which the trackable device listens for incoming control packets. The method may further comprise responding to receipt of the reception-frequency control packet by reducing the interval between reception time slots during which the trackable device listens for incoming control packets. The method may further comprise responding to the receipt of the reception-frequency control packet by reducing the interval between reception time slots during which the trackable device listens for incoming control packets when the trackable device is in the second transmission mode. Alternatively, the method may comprise responding to the receipt of the reception-frequency control packet by increasing the interval between reception time slots during which the trackable device listens for incoming control packets when the trackable device is in the second transmission mode.

The method may further comprise responding to wireless receipt of a device-initiated-transition control packet by disabling an ability of the trackable device to transition between the first and second positioning modes in response to a determination based on data that is locally available to the trackable device.

The transition between the first and second positioning modes may, in some examples, be caused in response to a determination, based on data from a movement sensor included in the trackable device, that a condition with respect to movement of the trackable device is satisfied.

In a second aspect, this specification describes a method comprising causing wireless transmission to a trackable device of a mode-transition control packet for causing the trackable device to transition between a first positioning mode and a second positioning mode, wherein, in the first positioning mode, the trackable device wirelessly transmits one or more data packets including a data portion for enabling determination of a bearing between the remote trackable device and a locator device and, in the second positioning mode, the trackable device wirelessly transmits one or more data packets which do not include the data portion for enabling determination of the bearing between the trackable device and the locator device.

The method of the second aspect may comprise causing the wireless transmission of the mode-transition control packet in response to determining that a current context of the trackable device satisfies a predefined condition. The current context may comprise the current position of the trackable device and the predefined condition is an occurrence of a transition by the trackable device across a border between first and second areas.

The mode-transition control packet may be configured to cause a modification of an interval between transmissions of radio frequency packets by the trackable device. Alternatively, the method may further comprise causing wireless transmission to the trackable device of a transmission-frequency control packet for causing modification of the interval between transmissions of radio frequency packets by the trackable device. The mode-transition control packet or the transmission-frequency control packet may indicate the interval to which the interval between transmissions should be modified.

The method may further comprise, prior to causing transmission of the mode-transition control packet, causing transmission to the trackable device of a reception-frequency control packet for causing the trackable device to modify an interval between reception time slots during which the trackable device listens for incoming control packets. The method may further comprise, when the trackable device is determined to be in the second transmission mode, causing transmission of the reception-frequency control packet, wherein the reception-frequency control packet is configured to cause the trackable device to reduce the interval between reception time slots during which the trackable device listens for incoming control packets. The method may further comprise, when the trackable device is determined to be in the second transmission mode, causing transmission of the reception-frequency control packet, wherein the reception-frequency control packet is configured to cause the trackable device to increase the interval between reception time slots during which the trackable device listens for incoming control packets.

The method may comprise causing transmission of a device-initiated-transition control packet for causing, in response to a determination based on data that is locally available to the trackable device, disabling of an ability of the trackable device to transition between the first and second positioning modes in response to a determination based on data that is locally available to the trackable device.

In a third aspect, this specification describes apparatus configured to perform a method according to either of the first and second aspects.

In a fourth aspect, this specification describes computer-readable instructions which when executed by computing apparatus cause the computing apparatus to perform a method according to either of the first and second aspects.

In a fifth aspect, this specification describes apparatus comprising at least one processor and at least one memory including computer program code which, when executed by the at least one processor, causes the apparatus to cause a trackable device to transition between a first positioning mode and a second positioning mode, wherein, in the first positioning mode, the trackable device causes wireless transmission of one or more data packets each including a data portion for enabling determination of a bearing between the trackable device and a locator device and, in the second positioning mode, the trackable device causes wireless transmission of one or more data packets which do not include the data portion for enabling determination of the bearing between the trackable device and the locator device.

In some examples, data packets may be transmitted by the trackable device with a higher frequency when in the first positioning mode than when in the second positioning mode.

The computer program code, when executed by the at least one processor, may cause the apparatus to cause the transition between the first and second positioning modes in response to wireless receipt by the trackable device of a mode-transition control packet or a determination based on data that is locally available to the trackable device. The computer program code, when executed by the at least one processor, may further cause the apparatus to cause the transition between the first and second positioning modes in response to receipt of the mode-transition control packet. The computer program code, when executed by the at least one processor, may further cause the apparatus to modify an interval between transmissions of radio frequency packets in response to receipt of the mode-transition control packet or in response to wireless receipt at the trackable device of a transmission-frequency control packet. The mode-transition control packet or the transmission-frequency control packet may indicate the interval to which the interval between transmissions should be modified.

The computer program code, when executed by the at least one processor, may cause the apparatus, prior to causing the transition between the first and second positioning modes, to respond to receipt of a reception-frequency control packet by modifying an interval between reception time slots during which the trackable device listens for incoming control packets. The computer program code, when executed by the at least one processor, may cause the apparatus to respond to receipt of the reception-frequency control packet by reducing the interval between reception time slots during which the trackable device listens for incoming control packets. The computer program code, when executed by the at least one processor, may cause the apparatus to respond to the receipt of the reception-frequency control packet by reducing the interval between reception time slots during which the trackable device listens for incoming control packets when the trackable device is in the second transmission mode. Alternatively, the computer program code, when executed by the at least one processor, may cause the apparatus to respond to the receipt of the reception-frequency control packet by increasing the interval between reception time slots during which the trackable device listens for incoming control packets when the trackable device is in the second transmission mode.

The computer program code, when executed by the at least one processor, may cause the apparatus to respond to wireless receipt of a device-initiated-transition control packet by disabling an ability of the trackable device to transition between the first and second positioning modes in response to a determination based on data that is locally available to the trackable device.

The transition between the first and second positioning modes may be caused in response to a determination, based on data from a movement sensor included in the trackable device, that a condition with respect to movement of the trackable device is satisfied.

In a sixth aspect, this specification describes apparatus comprising at least one processor, and at least one memory including computer program code, which when executed by the at least one processor, causes the apparatus to cause wireless transmission to a trackable device of a mode-transition control packet for causing the trackable device to transition between a first positioning mode and a second positioning mode, wherein, in the first positioning mode, the trackable device wirelessly transmits one or more data packets including a data portion for enabling determination of a bearing between the remote trackable device and a locator device and, in the second positioning mode, the trackable device wirelessly transmits one or more data packets which do not include the data portion for enabling determination of the bearing between the trackable device and the locator device.

The computer program code, when executed by the at least one processor, may cause the apparatus to cause the wireless transmission of the mode-transition control packet in response to determining that a current context of the trackable device satisfies a predefined condition. The current context may comprise the current position of the trackable device and the predefined condition is an occurrence of a transition by the trackable device across a border between first and second areas.

The mode-transition control packet may be configured to cause a modification of an interval between transmissions of radio frequency packets by the trackable device or wherein the computer program code, when executed by the at least one processor, further causes wireless transmission to the trackable device of a transmission-frequency control packet for causing modification of the interval between transmissions of radio frequency packets by the trackable device. The mode-transition control packet or the transmission-frequency control packet may indicate the frequency to which the transmission frequency should be modified.

The computer program code, when executed by the at least one processor, may cause the apparatus, prior to causing transmission of the mode-transition control packet, to cause transmission to the trackable device of a reception-frequency control packet for causing the trackable device to modify an interval between reception time slots during which the trackable device listens for incoming control packets. The computer program code, when executed by the at least one processor, may further cause the apparatus, when the trackable device is determined to be in the second transmission mode, to cause transmission of the reception-frequency control packet, wherein the reception-frequency control packet is configured to cause the trackable device to reduce the interval between reception time slots during which the trackable device listens for incoming control packets. Alternatively, the computer program code, when executed by the at least one processor, may cause the apparatus, when the trackable device is determined to be in the second transmission mode, to cause transmission of the reception-frequency control packet, wherein the reception-frequency control packet is configured to cause the trackable device to increase the interval between reception time slots during which the trackable device listens for incoming control packets.

The computer program code, when executed by the at least one processor, may cause the apparatus to cause transmission of a device-initiated-transition control packet for causing, in response to a determination based on data that is locally available to the trackable device, disabling of an ability of the trackable device to transition between the first and second positioning modes in response to a determination based on data that is locally available to the trackable device.

In a seventh aspect, this specification describes a computer-readable medium having computer-readable code stored thereon, the computer readable code, when executed by a least one processor, cause performance of at least causing a trackable device to transition between a first positioning mode and a second positioning mode, wherein, in the first positioning mode, the trackable device causes wireless transmission of one or more data packets each including a data portion for enabling determination of a bearing between the trackable device and a locator device and, in the second positioning mode, the trackable device causes wireless transmission of one or more data packets which do not include the data portion for enabling determination of the bearing between the trackable device and the locator device. The computer-readable code stored on the medium of the seventh aspect may further cause performance of any of the operations described with reference to the method of the first aspect.

In an eighth aspect, this specification describes a computer-readable medium having computer-readable code stored thereon, the computer readable code, when executed by a least one processor, cause performance of at least causing wireless transmission to a trackable device of a mode-transition control packet for causing the trackable device to transition between a first positioning mode and a second positioning mode, wherein, in the first positioning mode, the trackable device wirelessly transmits one or more data packets including a data portion for enabling determination of a bearing between the remote trackable device and a locator device and, in the second positioning mode, the trackable device wirelessly transmits one or more data packets which do not include the data portion for enabling determination of the bearing between the trackable device and the locator device. The computer-readable code stored on the medium of the eighth aspect may further cause performance of any of the operations described with reference to the method of the second aspect.

In a ninth aspect, this specification describes apparatus comprising means for causing a trackable device to transition between a first positioning mode and a second positioning mode, wherein, in the first positioning mode, the trackable device causes wireless transmission of one or more data packets each including a data portion for enabling determination of a bearing between the trackable device and a locator device and, in the second positioning mode, the trackable device causes wireless transmission of one or more data packets which do not include the data portion for enabling determination of the bearing between the trackable device and the locator device. The apparatus of the ninth aspect may further comprise means for causing performance of any of the operations described with reference to method of the first aspect.

In a tenth aspect, this specification describes apparatus comprising means for causing wireless transmission to a trackable device of a mode-transition control packet for causing the trackable device to transition between a first positioning mode and a second positioning mode, wherein, in the first positioning mode, the trackable device wirelessly transmits one or more data packets including a data portion for enabling determination of a bearing between the remote trackable device and a locator device and, in the second positioning mode, the trackable device wirelessly transmits one or more data packets which do not include the data portion for enabling determination of the bearing between the trackable device and the locator device. The apparatus of the tenth aspect may further comprise means for causing performance of any of the operations described with reference to method of the second aspect.

BRIEF DESCRIPTION OF THE FIGURES

For a more complete understanding of the methods, apparatuses and computer-readable instructions described herein, reference is now made to the following descriptions taken in connection with the accompanying drawings in which.

DETAILED DESCRIPTION

Figure 1:
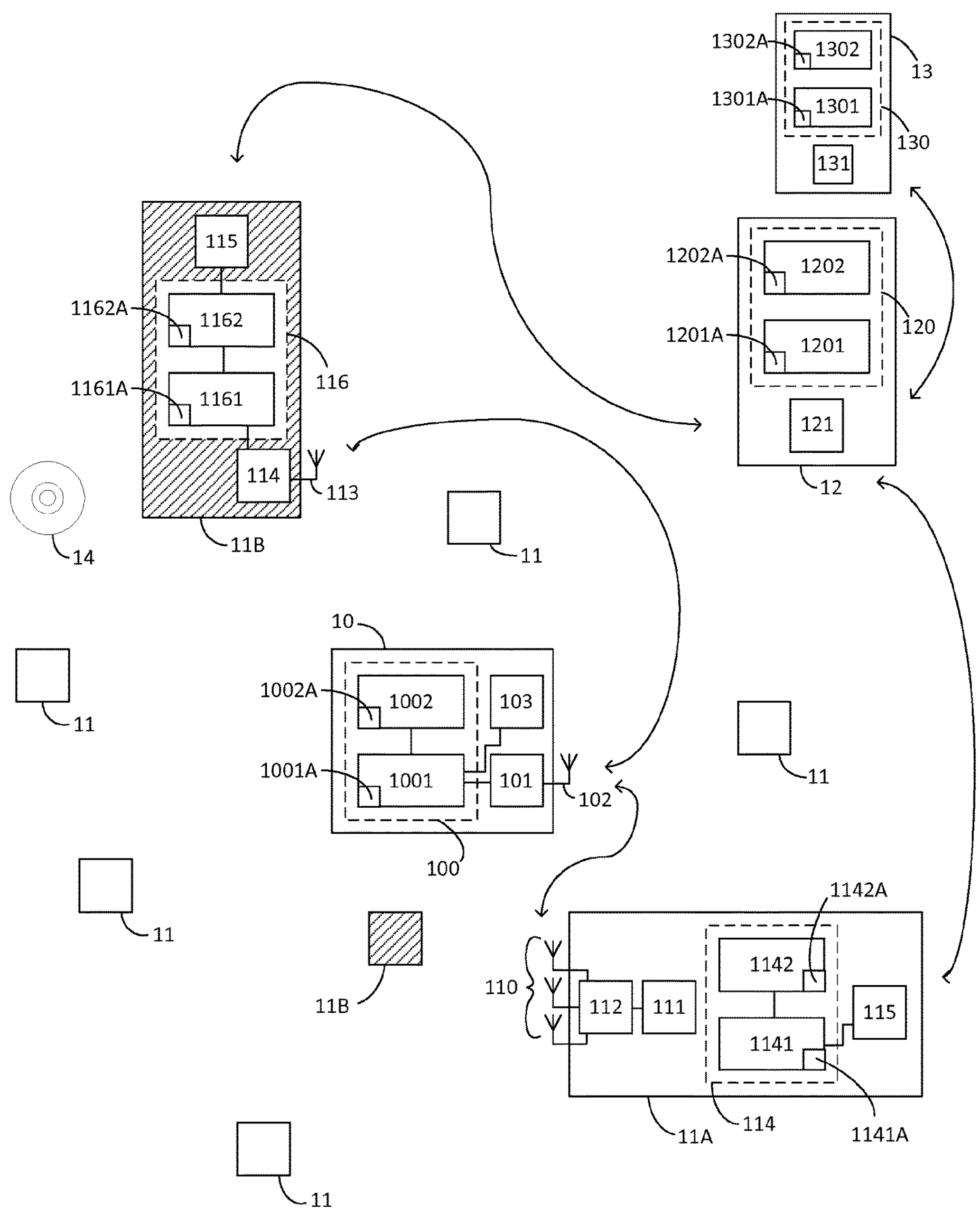
FIG. 1 is a positioning system in which a trackable device is operable to switch between two different positioning modes.

In the description and drawings, like reference numerals may refer to like elements throughout.

FIG. 1 is a positioning system 1 comprising at least one trackable device 10, at least one locator device 11, and positioning server apparatus 12 for determining a position of the at least one trackable device 10 based on data packets passed wirelessly between the trackable device 10 and the at least one locator device 11.

The positioning system 1 is capable of determining the position of the trackable device 10 using two different positioning modes, a first of which is higher accuracy and a second of which is lower accuracy but is less demanding of computational resources. For instance, the first mode may utilise High Accuracy Indoor Positioning (HAIP) techniques, whereas the second mode may utilise cost-optimised indoor positioning (COIP) techniques. Although the two modes of positioning are referred to as "indoor" positioning, it will be appreciated that a system which utilises these positioning modes may also be implemented outside. The trackable device 10 may be an electronic tag or a more complex device such as a personal computing/communications device (such as, but not limited to, a mobile phone, a tablet computer or a wearable computing device such as a smart watch). Although not shown in FIG. 1, it will be appreciated that the system 1 may include plural trackable devices which may be of various different types, with some or all of the devices providing the functionality described herein.

The system 1 includes at least one locator device 11A which is configured to operate in high-accuracy positioning (e.g. HAIP) mode (the first positioning mode) in which it enables a bearing from the trackable device to the locator device 11A to be determined based on data derived from receipt of a data packet which includes a specific data portion. The at least one locator device 11A which is operable in the high accuracy mode includes a phased array of antennas 110. The antennas of the array 110 are connected to transceiver circuitry 111 via a switch mechanism 112 which is configured to connect only one of the antennas to the transceiver circuitry 111 at any one time. The bearing to the trackable device 10 is determinable based on data derived from the receipt of the specific data portion of the data packet as the switch mechanism 112 sequentially connects a different one of the antennas to the transceiver circuitry 111. The data derived from the receipt of the data packet may, in some specific examples, include I and Q data. The locator device 11A further includes a controller 114 for controlling the other components of the device 11A in the manner discussed above and for providing various functionalities as discussed below. For instance, the controller 114 may cause data, derived from receipt of data packets from the trackable device 10, to be provided to the positioning server 12. Likewise, the controller 114 may cause control packets received from the positioning server 12 to be transmitted for receipt by the trackable device 10.

HAIP as developed by Nokia is known in the art. Indeed, it is mentioned, and is described in various levels of detail, in (among other publications) the following published PCT patent applications: WO 2014087196A1, WO2013179195A1, WO2014087198A1, WO 2015013904A1, WO 2014107869A1, WO2014108753A1, WO2014087199A1 and WO 2014087197A1. In view of these and other disclosures, the fundamental principles utilised by the trackable device 10, locator devices 11A and the positioning server apparatus 12 to provide HAIP are not described in further detail in this specification.

The system 1 also includes at least one locator device 11 which is configured to operate in cost-optimised indoor positioning (COIP) mode (the second positioning mode). In the COIP mode, the locator device 11 may enable a determination that a trackable device 10 is within communications range of the locator device 11 based on receipt of a data packet from the trackable device 10. In some instances, the at least one locator device 11 may further enable a determination as to the position of the trackable device with an accuracy of approximately 2 m. This may, however, require multiple locator devices 11 operating in the cost-optimised mode to receive the same data packet from a particular trackable device 10, with the position being determined using a measured signal strength of the data packet at each locator device 11 and a radio-map of the area in which the locator devices 11 are provided.

One or more of the locator devices 11 of the system 1 may be capable of operating in both of the high-accuracy positioning mode and the cost-optimised positioning mode. Such locator devices may be configured as described with reference to the high accuracy locator device 11A but, when operating in the cost-optimised mode, may be configured so as to use just one of the antennas of the array 110 to receive data packets from the trackable device 10.

In some examples, the system 1 may include one or more locator devices 11B which are configured to operate only in cost-optimised positioning mode. In the example of FIG. 1, these locators 11B are indicated using hatching. Such locator devices 11B may include a single antenna 113, which is connected to transceiver circuitry 114, for receiving data packets from the at least one trackable device 10 and, if appropriate, to transmit control packets for reception by the trackable device 10. The functionality provided by dedicated cost-optimised locator devices 11B may be controlled (or caused) by a controller 116 which forms part of the locator device 11B.

The trackable device 10 and the locator devices 11A, 11B, 11 may be configured to communicate using any suitable wireless transmission protocol. In some specific examples, however, the transceivers 101, 111, 114 of the trackable device 10 and the locator devices 11 may each be configured, under the control of respective controllers, to communicate with each other via a Bluetooth transmission protocol. For instance, the transceivers 101, 111, 114 may be configured to transmit and/or receive data packets (including data packets for enabling position determination and control packets) using a Bluetooth Low Energy protocol, as described in or compatible with the current version of the Core Bluetooth specification (Version 4.2). In other examples, however, at least some of the devices 11, 11A, 11B may also or additionally be configured to communicate using another suitable protocol. Such protocols may include but are not limited to 802.11 wireless local area network protocols, other types of Bluetooth protocol or IEEE 802.15.4 protocols.

The positioning server apparatus 12 is configured to receive from the locator devices 11 data derived from receipt of one or more data packets from the trackable device 10. When the locator devices 11 are operating in high-accuracy positioning mode, this data may include I and Q data as well as a device ID for identifying the trackable device 10. Data indicating the signal strength of the received data packet may also be passed to the positioning server apparatus 12. When the locator devices 11 are operating in the cost-optimised positioning mode this data may include the device ID and data indicating the signal strength of the received data packet. However, when operating in the cost-optimised mode, the locator devices 11 do not pass I and Q data to the positioning server apparatus 12. In both modes, additional data, such as sensor data derived from one or more sensors 103 in the trackable device 10 and signalling data (flags etc.) may also be included in the data packets transmitted by the trackable devices 10. This additional data may also be passed to the positioning server apparatus 12 for processing. The data processing and position determination (among other functionalities) may be provided by a controller 120.

Data is passed to the positioning server apparatus 12 via an input/output (I/O) interface 115 at the locator device 11. The data may be passed using any suitable protocol over a wired or wireless connection, and the I/O interface 115 is configured accordingly based on the type of connection and protocol used. The positioning server apparatus 12 also includes its own I/O interface 121 for receiving data from the locator devices 11 and also for providing data (such as control data) to the locator devices 11.

The positioning server apparatus 12 may be made up of one or more different computing apparatus which may be located in the same premises as the locator devices 11 (put another way, may be part of the local area network) or may be remotely located and connected to the locator devices 11 via the internet (put another way, may be a cloud server). Although not shown, when the positioning server apparatus 12 is remotely located, the system 1 may further include a gateway device, via which all data from the locator devices 10 is routed to the server apparatus 12 and vice versa.

As can be seen from FIG. 1, the trackable device 10 comprises at least a controller 100 and transceiver circuitry 101. The controller 100 (the configuration of which is discussed in more detail later) is configured to provide the functionality discussed below and also to control the operation of transceiver circuitry 101 to transmit and receive data packets via an antenna 102. In some examples which will be discussed in more detail below, the trackable device 10 may also include one or more sensors 103 for detecting conditions associated with the trackable device 10.

The trackable device 10 is configured to transition between the first and second positioning modes. When it is in first, high-accuracy, positioning mode, the trackable device 10 is operable to wirelessly transmit one or more data packets which each include the specific data portion for enabling determination of the bearing between the trackable device 10 and the HAIP locator device 11A. When in the second, cost-optimised, positioning mode, the trackable device 10 is operable to wirelessly transmit one or more data packets which do not include (or which omit) the specific data portion.

Put in other words, the controller 100 of the trackable device is configured to cause transition between operating in a first positioning mode and operating in a second positioning mode, wherein, in the first positioning mode, the trackable device 10 causes wireless transmission of one or more data packets each including a specific data portion which enables determination of a position of the trackable device with a first resolution and, in the second positioning mode, the trackable device causes wireless transmission of one or more data packets which do not include the specific data portion such that the second positioning mode enables determination of the position of the trackable device with a second, lower resolution.

By omitting the specific data portion, the data packets are shorter and consequently less time is required for their transmission. Put another way, the transmission of data packets in the first, high accuracy positioning mode utilises more power than the transmission of data packets in the second, cost-optimised positioning mode. Moreover, the transmission time for data packets in the second, cost-optimised positioning mode is reduced (for instance, in HAIP, transmission of the specific data portion takes 160 μs). As such, the likelihood of collisions between packets in congested areas is reduced. In addition, in examples in which sensor data is transmitted, the omission of the specific data portion enables the data packets usually utilised primarily for positioning to include some, or a greater quantity of, sensor data. As such, the number of data packets that need to be sent in order to deliver the same amount of sensor data can be reduced. This may significantly reduce the power consumption by the trackable device 10. For instance, if sensor data needs to be sent once per second and a data packet for enabling tracking of the device 10 also needs to be sent once per second, by omitting the specific data portion it may be possible to include the sensor data in the data packet for enabling tracking of the device, thereby halving the amount of packets that need to be sent, which has a significant effect on energy consumption of the device.

The trackable device 10 may be configured to transition between the first and second positioning modes in response to wireless receipt of a mode-transition control packet and/or a determination based on data that is locally available to the trackable device 10. Transition between positioning modes in response to wireless receipt of a mode-transition control packet may be referred to as a "server initiated transition" and a transition based on data that is locally available to the trackable device 10 may be referred to as a "device-initiated transition".

The mode-transition control packet may be wirelessly transmitted by one or more of the locator devices 11 under the control of the positioning server apparatus 12. The positioning server apparatus 12 may cause the wireless transmission of the mode-transition control packet in response to determining that a current context of the trackable device 10 satisfies a predefined condition. For instance, the current context may comprise the most recently determined position of the trackable device 10 and the predefined condition may be an occurrence of a transition by the trackable device 10 across a virtual border (a geo-fence) between first and second areas in which the first and second positioning modes are respectively more appropriate.

As will of course be appreciated, there may be many other situations in response to which the positioning server apparatus 12 causes transmission of the mode-transition control packet. For instance, the mode-transition control packet may be caused to be transmitted in response to a determination that the positioning server apparatus 12 is, or is becoming, overloaded such that it is not, or soon will not, be able to determine positions of all the trackable devices 10 with HAIP accuracy. Similarly, the mode transition control packets may be transmitted in response to a determination that an area is congested (e.g. contains a particularly high number of trackable devices). In such situations, the device 10 may be controlled to operate in COIP mode in which packets are transmitted less often thereby to reduce the number of collisions between packets.

Similarly, the mode-transition control packets may be transmitted in response to a determination that a bandwidth of a connection between the positioning server apparatus 12 and an application server apparatus 13, which utilises the determined positions of trackable devices 10, is limited or reserved for some other use. In such situations, the positioning server apparatus 12 may cause the trackable device 10 to transition to the COIP mode wherein the position of the device is determined less frequently.

In some examples, the application server apparatus 13 (or a user in communication with the application server apparatus) may define criteria based on which mode transition control packets are caused to be transmitted. Similarly, the application server 13 (e.g. based on user defined criteria or other inputs) may indicate to the positioning server 12 priorities for the trackable devices 10. Based on the priorities, the positioning server 12 may determine which devices should use which mode and send mode-transition control packets accordingly. For instance, higher priority devices may be controlled to use HAIP mode if possible. In such examples, the application server 13 may determine the priorities, for example, based on the determined positions of the trackable devices 10. The priorities of the devices 10 may also or alternatively be determined based on sensor data or other parameters, such as the time of day.

In some situations, the sensor data received from the trackable devices 10 may be more important than their positions and, in such situations, the trackable devices 10 may be controlled to operate in COIP mode thereby to save bandwidth (due to fewer transmissions), which can be utilised for transmitting more sensor data. This may be indicated by the application server 13 to the positioning server apparatus 12 which responds by transmitting mode-transition control packets as necessary. In some examples, if the trackable device 10 is carried by a person, the person or an administrator may indicate via the application server 13 the accuracy with which positioning should be carried out. For instance, when the HAIP accuracy is no longer required, the user may indicate this thereby to cause the device 10 to be switched to the less power intensive COIP mode. The application server 13 may then send the necessary indication to the positioning server apparatus 12, which responds by transmitting mode-transition control packets as necessary.

The mode-transition control packet may in some examples indicate only that a mode transition should be carried out. In other examples, however, the mode-transition control packet may be configured so as to indicate explicitly whether the transition is from the first, high-accuracy positioning mode to the second, cost-optimised positioning mode or vice versa.

In some examples, when it is in second, cost-optimised, positioning mode, the trackable device 10 may be operable to wirelessly transmit data packets at a lower frequency (i.e. less often) than that at which packets are transmitted when the device is operating in the first, high-accuracy, positioning mode. As such, the transition to second mode, in addition to reducing the amount of data transmitted by the device, may also reduce the overall number of packets being sent. For instance, in some implementations (e.g. when tracking devices associated with participants in a sports match), in the high-accuracy positioning mode, a frequency of 20 Hz (i.e. twenty packets per second) may be used, whereas after switching to the cost-optimised mode (e.g. because the player with which the trackable device is associated has been substituted), a frequency of less than or equal to 1 Hz (i.e. one packet per second) may be used.

The modification in the frequency with which data packets are transmitted by the trackable device may be performed by the trackable device 10 in response to receipt of the mode-transition control packet or in response to wireless receipt at the trackable device 10 of another dedicated control packet which may be referred to as a transmission-frequency control packet. As with the mode-transition control packet, the transmission-frequency control packet may be transmitted by one or more of the locator devices 11 under the control of the positioning server 12. In either case, the control packet in response to which the transmission frequency is modified may indicate the frequency to which the transmission frequency should be modified. Alternatively, the transmission frequencies with which the trackable device 10 transmits data packets when in the two positioning modes may be pre-stored at the trackable device 10. As such, in some examples, no specific instruction from the positioning server 12 may be required for the transmission frequency to be modified by the trackable device 10.

The trackable device 10 may be further configured to respond to receipt of a control packet of another type, which may be referred to as reception-frequency control packet, by modifying an interval between reception time slots during which the trackable device listens for incoming control packets. A reception-frequency control packet may be transmitted and received prior to transmission and receipt of the mode-transition control packet. In some specific examples, the trackable device 10 may respond to receipt of the reception-frequency control packet by reducing the interval between reception time slots during which the trackable device 10 listens for incoming control packets. This may occur for instance when the positioning server 12 determines that a transition from the cost-optimised mode to the high accuracy mode is imminent and so, by decreasing the interval between reception time slots, the trackable device 10 is able to receive the mode-transition control packet for causing transition to the high-accuracy mode sooner than it otherwise would, thereby facilitating a timely transition from the second to first mode. When the trackable device 10 is transmitting data packets which omit the specific data portion (i.e. is in cost-optimised mode) but is also operating such that it listens for control packets with an increased frequency (i.e. allocates a higher number of reception slots per unit of time than usual) it may be said to be operating in the third, or "near-high-accuracy", mode. The reception-frequency control packet may, in some examples, specify the frequency of reception slots. In other examples, the trackable device 10 may be configured to respond to a reception-frequency control packet by modifying the reception slot frequency to a pre-defined frequency.

In some examples, the trackable device 10 may be configured also to respond to the receipt of the reception-frequency control packet, when the trackable device is in the second transmission mode, by increasing the interval between reception time slots during which the trackable device 10 listens for incoming control packets. In these examples, the reception-frequency control packet may be of a different type to that which causes the decrease in intervals between reception slots or the reception-frequency control packet may specify the new interval (or reception slot frequency). An increase in the interval between reception time slots may be initiated when the positioning server 12 determines that a transition from the second mode to the first mode is unlikely. The reduction in the frequency of reception slots thus reduces power consumption of the device. This is because the transceiver circuitry 101 of the device 10 may be asleep when the device 10 is neither transmitting packets nor listening for incoming control packets.

The determination as to whether a transition from the second to the first mode is imminent or unlikely may be made based on one or more different factors. In some examples, it may be based on the determined position of the trackable device. For instance, it may be based on a distance between the determined position and a virtual border (a geo-fence) between a first area in which high-accuracy is more appropriate and a second area in which cost-optimised positioning is more appropriate. Additionally, it may be based on a current heading of the device, which may be determined using previously determined positions of the device and/or movement sensor data (such as accelerometer data) received from the trackable device. For instance, the positioning server 12 may determine that a transition to the first positioning mode is imminent if the position of the trackable device 10 is within a pre-defined range of the geo-fence and the device 10 is heading towards the geo-fence. Similarly, if the trackable device is outside a particular range from the geo-fence and is heading away from the geo-fence, it may be determined that a transition to the first positioning mode is unlikely. In some examples, the velocity of the device (e.g. determined based on successively determined positions and/or movement sensor data) may be taken into account.

As mentioned above, the trackable 10 device may be configured to transition between the first and second positioning modes in response to a determination based on data that is locally available to the trackable device 10. For instance, this data may include data from the one or more sensors 103 that are included the device. For example, the trackable device 10 may be configured to transition between the first and second positioning modes in response to a determination, based on data from a movement sensor (e.g. an accelerometer) included in the trackable device 10, that a condition with respect to movement of the trackable device is satisfied. This condition may, for instance, relate to a velocity or acceleration of the trackable device 10.

In some examples, the trackable device 10 may additionally or alternatively include one or more of a battery level sensor, temperature sensor, a light sensor and a vibration sensor. A current context of the device 10 may be determined based on any one output of or combination of the outputs, of one or more sensors 103 included in the trackable device 10. The determination as to whether to transition between modes may then be made based on the determined current context.

In some examples, the trackable device 10 may be able to detect collisions between its packets and those of other devices and, in dependence on the frequency of the collisions, the device 10 may cause mode transitions (e.g. to HAIP mode when frequency of collisions is low and to COIP mode when frequency of collisions is high). In other examples, the trackable device 10 may be determined to detect the proximity and/or a number of other devices in an area (e.g. due to detection of their packets, for instance with a signal strength above a certain threshold). The device 10 may cause a positioning mode transition in response to the determined proximity/number of other devices (e.g. from COIP to HAIP when a number of devices below a threshold are in the area and HAIP to COIP when a number of devices above a threshold are in the area). In other examples, the positioning mode transition may be caused in response to a time (e.g. based on an internal clock) or a user input (e.g. received via a button or other on-device user interface or received as a message from another device that acts as remote control for the trackable device 10).

In some examples, the trackable device 10 may be configured to disable the ability of the trackable device to transition between the first and second positioning modes in response to a determination based on data that is locally available to the trackable device 10 (e.g. sensor data derived from one or more sensors located in the device 10). Put another way, the trackable device 10 may be configured to disable performance of device-initiated transitions. The disabling of this functionality may be in response to a control packet, which may be referred to as a "device-initiated-transition" control packet, which is caused to be transmitted by the positioning server apparatus 12. The positioning server apparatus 12 may cause transmission of the device-initiated-transition control packet thereby to prevent the trackable device from transitioning between the positioning modes when it is not appropriate to do so. For example, the positioning server apparatus 12 may determine that it is critical to track the trackable device 20 with HAIP accuracy (e.g. because the trackable device is inside a geo-fence) and so may cause transmission of the device-initiated-transition control packet thereby to prevent the device from transitioning based on local data such as temperature, light level, battery level or the like. In other examples, the transmission of the device-initiated-transition control packet may be in response to a user indicating (e.g. via the application server 13) that the device 10 should operate in a particular mode.

The trackable device 10 may be further configured to re-enable the ability of the trackable device to transition between the first and second positioning modes in response to the determination based on data that is locally available to the trackable device. This may occur, for instance, in response to expiry of a timer started after the functionality was disabled or in response to receipt of another device-initiated-transition control packet.

As can be seen from FIG. 1, and as discussed above the positioning system may further include an application server apparatus 13 which is configured to receive information identifying the determined positions of trackable devices 10 from the positioning server apparatuses 12. The application server apparatus 13 may be configured to output data for enabling provision of a user interface including a visual display of the locations of the trackable devices 10 to a user. The user may be able to interact with this user interface to select particular trackable devices 10 thereby to dictate in which positioning mode the device 10 should operate. The user interface may be configured such that trackable devices 10 operating in the first positioning mode are indicated in a first colour and the trackable devices 10 operating in the second positioning mode are indicated in a second colour. The application server apparatus 13 may thus respond to a selection of a particular device (e.g. by touching, clicking or zooming in on the visual indication of the device) by sending a control signal to positioning server apparatus 12 for causing a control packet to be transmitted to the selected device. The functionality of the application server apparatus 13 may be provided under the control of a controller 130

Figure 2:
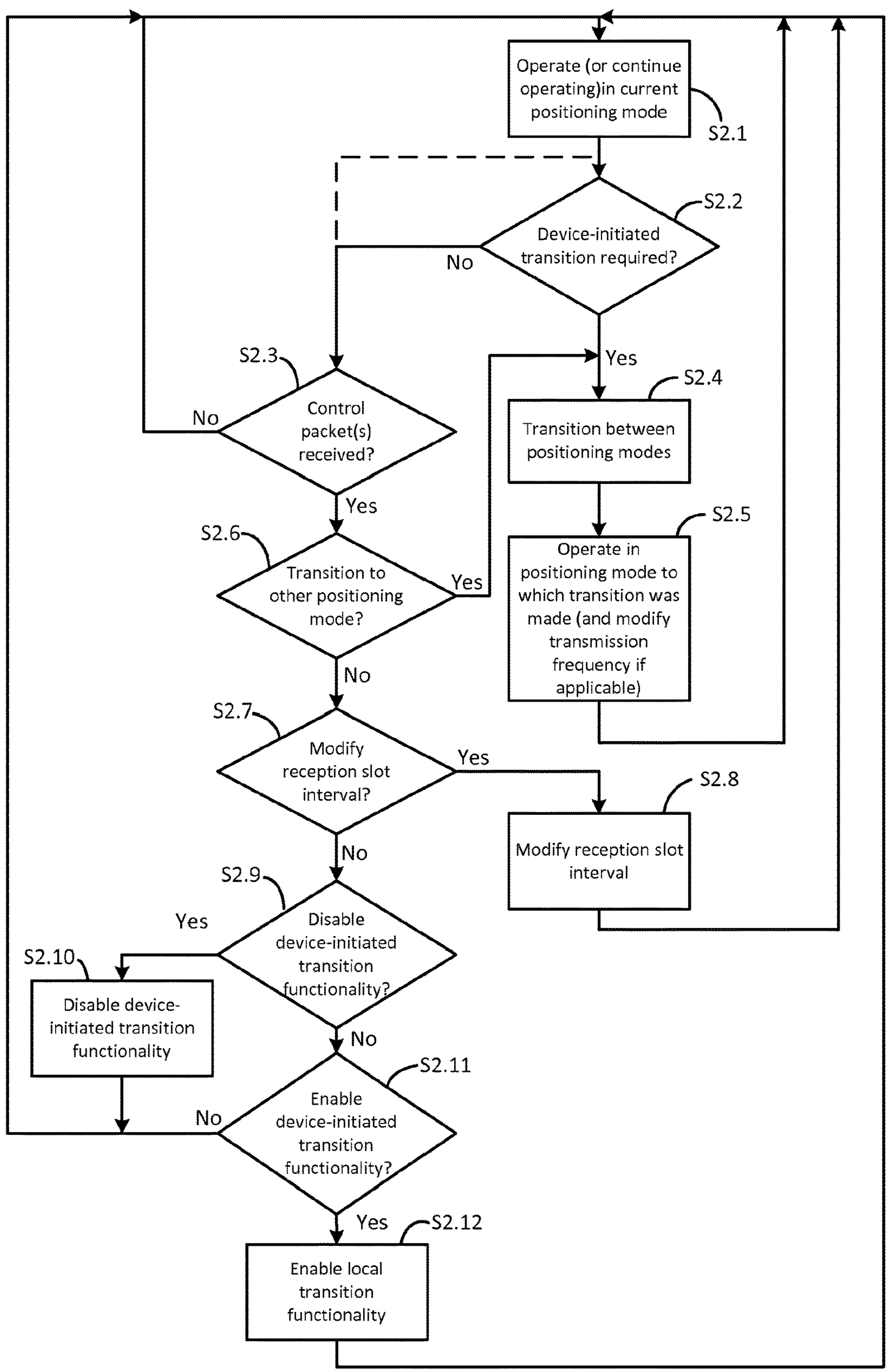
FIG. 2 is a flow chart schematically illustrating various functionalities which may be provided by the trackable device of FIG. 1.

FIG. 2 is a flow chart illustrating various operations and functionality which may be provided by the trackable device 10 of FIG. 1.

In operation S2.1, the device 10 is operating in a current one of the first and second positioning modes. As such, it either causes regular transmission of data packets including the specific data portion (when in the first mode) or which omit the specific data portion (when in the second mode).

In operation S2.2, it is determined if a transition between positioning modes should be carried out. This particular determination is carried out based on the data that is locally available to the trackable device. For instance, it may be based on a determination that a current context of the device 10 satisfies (or has satisfied) a pre-determined condition. For example, the local data may be derived from a movement sensor (such as an accelerometer) which indicates that a characteristic associated with movement of the device is above or below a particular threshold. For instance, if the data from the movement sensor 103 indicates that the velocity or acceleration of the device is above a threshold, the controller 100 may determine that, if not already in the high accuracy positioning mode, a transition to that mode should be made. Similarly, if the velocity/acceleration is determined to have fallen below a threshold, the controller may determine that a transition to the second, cost-optimised positioning mode should be carried out. Other examples of current context based on local data may include time (e.g. high accuracy positioning may be used at certain times of day when movement of the device 10 is more likely whereas cost-optimised positioning may be used at times of the day when movement of the device 10 is less likely) or battery level (e.g. when the battery level falls below a certain threshold, the second, cost-optimised positioning mode should be used).

If it is determined that a mode transition is not required, the method may proceed to operation S2.3 in which it is determined if a control packet for controlling the operation of the trackable device 10 has been wirelessly received. Although operations S2.2 and S2.3 are shown to be successive, it will of course be appreciated that in reality these determinations may be performed concurrently, such that the trackable device 10 is ready to respond to a positive outcome in respect of either determination at all (or most) times. Put another way, the controller loo may be continuously (or at least regularly) monitoring the local data (unless this functionality is disabled) and allocating reception time slots in which control packets are able to be received.

The controller 100 may allocate a reception time slot after every n data packet transmissions (e.g. after second, third, fourth or fifth transmission). The occurrence of a reception slot may be indicated to the positioning server 12 by information (e.g. a flag) included in the data packet which immediately precedes the reception time slot (or is a certain number of transmission slots prior to the reception slot). The information included in the data packet which indicates an occurrence of a reception time slot may also indicate the length of the reception slot and/or the frequency with which reception time slots occur.

If a negative determination is reached in both of operations S2.2 and S2.3, the trackable device 10 returns to operation S2.1 thereby to continue to operate in the current positioning mode.

If, in operation S2.2, it is determined based on locally available data that a mode transition should occur, operation S2.4 is performed. In operation S2.4, a device-initiated mode transition between positioning modes is performed. After this, the trackable device 10 (in operation S2.5) operates in the positioning mode to which the transition was made. As discussed previously, the change in positioning mode may include a modification in a frequency of transmission of data packets. In such examples, operation S2.5 may include transmission of data packets with the modified frequency. For instance, when in the cost-optimised mode, the interval between the transmission of data packets may be more than one second, whereas in high accuracy mode, the interval may be for instance between 10 milliseconds and 100 milliseconds.

After operation S2.5, the controller loo may return to monitoring the locally available data to determine (in operation S2.2) if a mode transition is required. As mentioned above, although it is not shown in the Figure, the device 10 may be monitoring for incoming control packets in addition to monitoring the locally available data.

Prior to discussing operations S2.6 to S2.12, it should first be noted out that these operations and the order in which they are described are only to illustrate various examples of operations and functions which may be provided by the trackable device 10 in response to control packets received from the positioning server apparatus 12 via the locator devices 11. In reality, the various illustrated determinations (e.g. one or more of S2.5, S2.6, S2.7, S2.9 and S2.11) may not actually be performed. Instead, all of illustrated operations S2.5 to S2.12 may be replaced with the following operations: a) receive control packet(s), b) determine instruction(s) based on control packet, and c) carry out instructions. However, so as to facilitate the understanding of the various functionalities that may be provided by the positioning system 1 described herein, operations S2.6 to S2.12 will now be described.

Returning to operation S2.3, if it is determined that a control packet has been received, the device 10 proceeds to operation S2.6, in which it is determined if a positioning mode transition has been instructed. This may be determined based on the type of the control packet (e.g. whether it is a mode-transition control packet) which may be indicated in a type field of the control packet. In some examples, the mode-transition control packet may include an indicator for indicating into which positioning mode the transition is required. For instance, the transition-control packet may indicate that a transition into the second positioning mode is required.

The actual process performed in operation S2.6 may depend on the information included in the control packet. For instance, if the control packet does not indicate a target positioning mode (into which the transition should be made), the device 10 may simply respond to incoming mode transition control packets by proceeding directly to operation S2.4 in which a transition to the other positioning mode is carried out. However, if the mode-transition control packet indicates the target mode, the device may first compare this with the positioning mode in which it is currently operating and may determine that a transition is required only if the current positioning mode and the target positioning mode indicated by the mode-transition control packet are different. Either way, after determining that a mode transition is required, the device proceeds to operation S2.4.

As discussed previously, the mode-transition control packet may additionally indicate a target transmission frequency. As such, when operating in the other positioning mode (in operation S2.5), the device may additionally transmit data packets with the indicated frequency. In other examples, however, a separate transmission-frequency control packet which indicates the required frequency of transmission of data packets may be sent in addition to the mode-transition control packet. Although not explicitly shown in FIG. 2, this transmission-frequency control packet may be received and the trackable device may modify the frequency at which data packets are transmitted accordingly.

If it is determined, in operation S2.6, that the incoming control packet does not indicate that a positioning mode transition is required, the device 10 may proceed to operation S2.7. In operation S2.7, the device 10 determines if a modification in the frequency of (or interval between) reception time slots is required. This may be indicated by a reception-frequency control packet. As with the mode-transition control packet, the nature of this control packet may be indicated in a type field. This control packet may additionally indicate a target reception time slot frequency. The indication may be explicit (e.g. it may specify an interval between successive reception time slots) or may be implicit (e.g. it may specify a particular reception slot frequency level—high, medium, low—which may be used by the trackable device 10 to identify the reception slot interval based on stored information).

As discussed above, the positioning server apparatus 12 may cause a change in a reception time slot frequency when it determines based on a current context (e.g. one or more of position, heading and velocity) of the trackable device 10 that a mode transition is probable or that a mode transition is unlikely. The reception slot frequency may be increased (i.e. the device 10 may provide reception time slots more regularly) when a mode transition is determined to be imminent, such that the mode transition, when it is required, can be performed in a timely manner. Conversely, the reception slot frequency may be reduced (i.e. the device may provide reception slots less regularly) when a mode transition is unlikely so as to reduce power consumption by the device 10. In one specific, non-limiting, example, the increased reception slot frequency may correspond to one reception time slot every 100 ms, the normal reception time slot may correspond to one reception time slot every 1 s and the reduced frequency may correspond to one reception time slot every 10 s.

It may be more common for the reception slot frequency to be modified when the device 10 is operating in the cost-optimised positioning mode, although such modifications may also be caused when the device is already in high-accuracy mode as the benefits (timely mode transition vs. power saving) still apply.

If, in operation S2.7, it is determined that a modification in reception slot frequency is required, the device 10 proceeds to performance of operation S2.8 in which the frequency of allocation of reception slots is modified in accordance with the reception-interval control packet. After operation S2.8, the device 10 may return to operations S2.1, in which it continues to operate in the current positioning mode.

If, in operation S2.7, it is determined that a modification in reception time slot frequency is not required, the device 10 may proceed to operation S2.9. In operation S2.9, the device 10 determines if the control packet indicates that it should disable its ability to perform "device-initiated mode transitions" (i.e. its ability to transition between positioning modes based on only locally available data). As discussed previously, this is indicated by a device-initiated-transition control packet. The device-initiated-transition control packet may indicate explicitly whether device-initiated transitions should be disabled or enabled or may simply indicate that a change in the ability of the device 10 to perform device-initiated transitions should be caused.

If it is determined that the ability of the device to initiate mode transitions based on locally available data should be disabled, the device 10 proceeds to operation S2.10 in which the device-initiated transitions are disabled. After this, the device 10 returns to operation e S2.1 in which it continues to operate in the current mode. It should be noted, however, that after disabling device-initiated transitions, the device 10 subsequently bypasses operation S.2.2 and proceeds from operation S2.1 to operation S2.3.

If it is determined in operation S2.9 that the ability of the device to initiate mode transitions based on locally available data should not be disabled, the device 10 proceeds to operation S2.11. In operation S2.11, it is determined if device-initiated transitions should be enabled. This may be performed in response to a received device-initiated-transition control packet. If a negative determination is reached in operations S2.11, the device 10 returns to operation S2.1 and continues to operate in the current positioning mode. As will be appreciated, after operation S2.1, the device may proceed to operation S2.3 (if device-initiated transitions are currently disabled) and to operation S2.2 (if device-initiated transitions are not currently disabled).

If a positive determination is reached in operation S2.11, the device 10 proceeds (in operation S2.12) to enable the ability to perform device-initiated mode transitions. After this, the device 10 continues to operate in the original positioning mode and returns to performance of either or both of operations S2.3 and S2.2.

Although not illustrated in FIG. 2, in some examples, the device 10 may initiate the modification of the reception slot interval (e.g. it may increase the interval in response to determining that the battery level is low). The modified reception slot interval may then be indicated to the positioning server apparatus 12.

Figure 3:
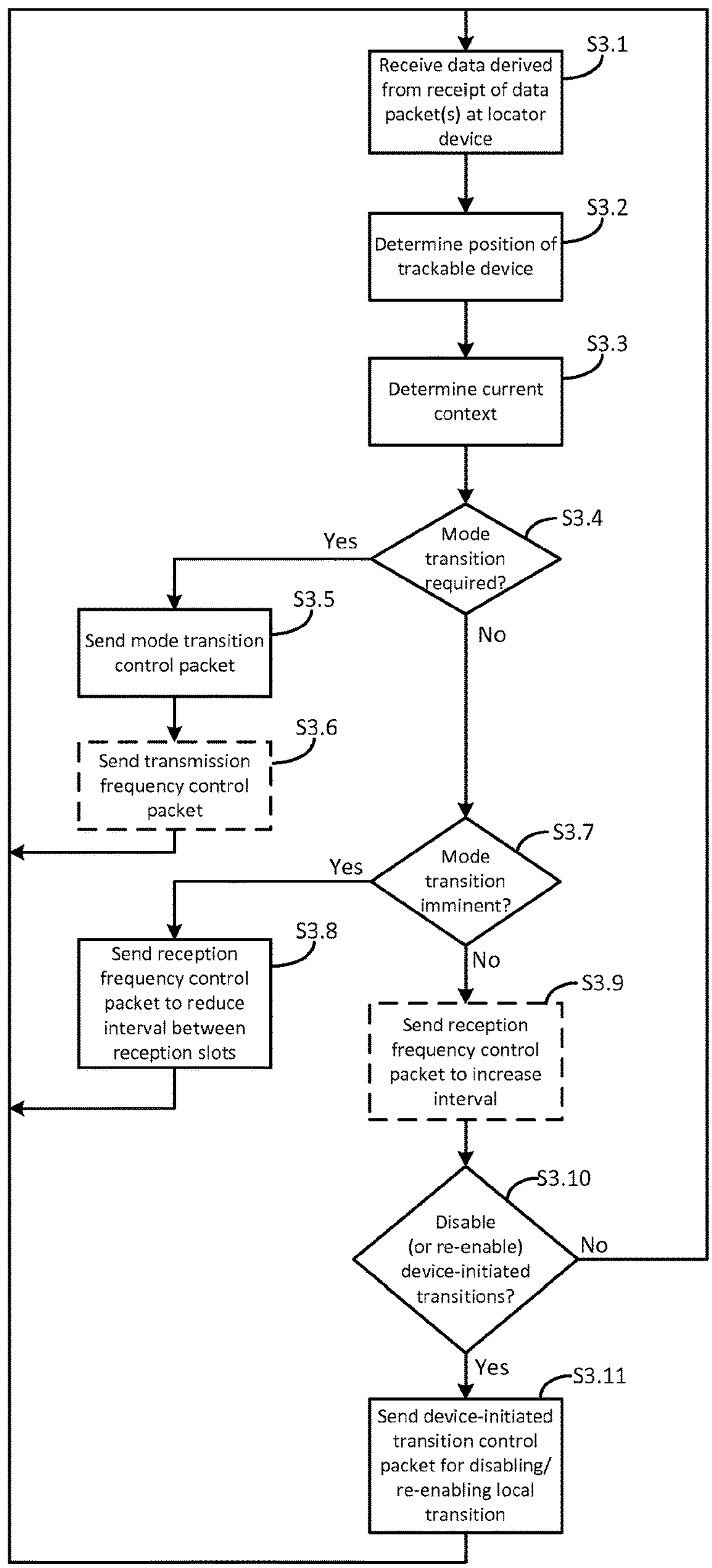
FIG. 3 is a flow chart schematically illustrating various functionalities which may be provided by the positioning server apparatus of FIG. 1.

FIG. 3 is a flow chart illustrating various operations and functionality which may be performed by the positioning server apparatus 12 of FIG. 1.

In operation S3.1, the positioning server apparatus 12 receives from the one or more locator devices 11 data derived from receipt of the data packets transmitted by the trackable device 10 to the locator devices 11. The actual data that is received by the positioning server apparatus 12 depends on the positioning mode in which the trackable device 10 is operating. For instance, if the trackable device is operating in the first, high accuracy, positioning mode the data packets transmitted include the specific data portion for enabling the bearing towards the trackable device to be received. As such, the data received by the positioning server may include, for instance, I and Q data for enabling this determination to be made. The received data may also include a trackable device ID for identifying the trackable device and, in some examples, also an indication of the signal strength of the received data packet. If the trackable device is operating in the second, cost-optimised, mode the data received at the positioning server apparatus may include the device ID and in some examples also the indication of the signal strength of the received packet. Regardless of the positioning mode, the received data may in some examples include sensor data derived from one or more sensors 103 included in the trackable device 10.

Subsequently, after receiving the data, the positioning server apparatus 12 uses the received data to determine a position of the trackable device 10 in operation S3.2. As discussed previously, the resolution of the determined position may depend on the positioning mode currently being operated by the trackable device 10. For instance, when the device 10 is operating in high accuracy mode, a resolution of better than 30 centimeters may be possible whereas when the device 10 is operating in cost-optimised mode, resolution of 3 meters or less (e.g. room level resolution) may be achieved.

Next, in operation S3.3, the positioning server apparatus 12 may determine a current context of the trackable device. The current context may be determined based on the determined position of the trackable device as well as, in some examples, data derived from the sensors 103 provided at the trackable device 10. The current context may be, for example, a position of the device 10, a position and a current heading (e.g. determined based on previously calculated positions) or a position and current velocity of the device 10 (for instance, calculated based on previously determined positions and/or data derived from one or more movement sensor included in the trackable device).

Next, in operation S3.4, the positioning server apparatus 12 determines if a mode transition is required. This may be determined by determining whether a particular condition with respect to the current context of the trackable device 10 has been satisfied. In one example, the condition may be that the trackable device 10 has crossed a virtual border (a geofence) between a first area in which a current positioning mode is more appropriate and a second area in which the alternative positioning mode is more appropriate. As an example, an area in which high accuracy may be more appropriate may be a private or secure area of a facility (such as a hospital or a prison), whereas lower accuracy cost-optimised positioning may be appropriate in public areas of the same facility. As such, when the current context indicates that the trackable device has passed from a secure area to a public area or vice versa, the positioning server apparatus may determine that a transition in positioning mode should be caused. In other examples, the appropriate positioning mode may be dependent on, for instance, proximity of the trackable device to a locator device 11A which is capable of providing high accuracy positioning. For instance, when a trackable device is outside a predetermined range from a high accuracy locator device 11A (which may be the maximum distance at which high accuracy positioning is possible), the cost-optimised positioning mode may be more appropriate. When it is determined that the trackable device 10 is within the maximum range from the locator device 11A, it may be determined that the high accuracy positioning mode is more appropriate. The range between the trackable device 10 and the locator device may be determined based on the determined location of the trackable device 10 or based on a signal strength of data packets received at the locator device 11A. The use of signal strength to determine range may be more appropriate for instance when the locator device is mobile, e.g. mounted on an indoor drone or other such vehicle.

If it is determined in operation S3.4 that a mode transition is required, the positioning server apparatus proceeds to operation S3.5 in which it causes a mode-transition control packet to be transmitted to the trackable device 10 via one or more of the locator devices 11. The control packets may be addressed to the trackable device 10 using the trackable device's ID. The security of the control packet may be enhanced by encrypting the control packet with a secret key which is known only to the trackable device 10 and the positioning server apparatus 12. As will be appreciated, the control packets of other types may also be encrypted in this way.

As discussed previously, the mode-transition control packet may also indicate a transmission frequency at which data packets should be transmitted after the mode-transition has been carried out. However, in other examples, the required frequency may be indicated in a separately transmitted transmission-frequency control packet, transmission of which may be caused in operation S3.6.

After operations S3.5 or S3.6, the positioning server apparatus 12 returns to operation S3.1.

If, in operation S3.4, it is determined that a mode-transition is not required, the positioning server apparatus may proceed to operation S3.7. In operation S3.7, the positioning server apparatus 12 determines if a mode-transition is imminent. If it is determined that a mode-transition is imminent, the positioning server apparatus 12 proceeds to operation S3.8. In operation S3.8, transmission of a reception-frequency control packet addressed to the trackable device 10 is caused. The reception frequency control packet of operation S3.8 may be configured to cause the trackable device to increase the frequency with which it allocates reception time slots. As such, the trackable device 10 is more likely to be ready to receive the mode-transition control packet when it is sent. The reception-frequency control packet may explicitly specify a reception slot frequency (or interval) or may instead specify a frequency level (e.g. high, normal or low frequency). After causing transmission of the reception frequency control packet, the positioning server apparatus 12 returns to operation S3.1.

If, in operation S3.7 it is determined that a mode-transition is not imminent, the positioning server apparatus 12 may proceed to either one of operations S3.9 and S3.10.

In operation S3.9, the positioning server apparatus 12 may cause transmission of a reception-frequency control packet for decreasing the frequency of reception time slots, i.e. increasing the interval between reception time slots. This may enable the trackable device 10 to save power and may be transmitted when the positioning server apparatus 12 determines that a mode transition is particularly unlikely.

The determination as to whether or not a mode-transition is imminent or is unlikely may be determined based on a current context of the trackable device 10. For instance, if a trackable device is within a particular range of a geofence and is heading towards the geofence the positioning server apparatus 12 may determine that a mode transition is imminent. Conversely, if the trackable device is outside the predefined range from the geofence and is heading away from the geofence the positioning server apparatus may determine that a mode transition is unlikely.

In operation S3.10, the positioning server apparatus determines if device-initiated transitions should be disabled or, if they are already disabled, re-enabled. Again, this may be determined on the basis of the current context. For instance, in some specific geographic areas, it may be unacceptable for the trackable device 10 to operate in the cost-optimised positioning mode (because high accuracy positioning is required). As such, when in these areas, the positioning server apparatus 12 may cause transmission of a device-initiated-transition control packet thereby to disable the ability of the device 10 to initiate a transition to the cost-optimised mode.

If, based on the current context, it is determined that the device-initiated transition functionality should be disabled (or re-enabled), the positioning server apparatus 12 proceeds to operation S3.11 in which a device-initiated-transition control packet is caused to be transmitted to the trackable device 10 via one or more of the locator devices 11. The device-initiated-transition control packet may indicate whether the device-initiated transition functionality is to be enabled or disabled. After operation S3.11, the positioning server apparatus returns to operation S3.1.

If in operation S3.10 it is determined that it is not required to disable or re-enable device-initiated-transitions, the positioning server apparatus returns to operation S3.1.

As will be appreciated from the above description with respect to FIGS. 1 to 3, the positioning system 1 described in this specification provides many technical benefits such as reducing power consumption and reducing collisions and bandwidth use, while at the same time ensuring that position information of an appropriate degree of accuracy is obtained.

Example Implementations

The above described system may be applicable in many different scenarios. For instance, as mentioned previously, the system 1 may be used in a sporting arena (e.g. an ice hockey arena) to monitor the movement of the players. In such a scenario, trackable devices may be associated with each of the players. When a player is involved in game (e.g. is on the court or rink), the high-accuracy positioning mode may be more appropriate (for detailed performance analysis etc.). However, when the player is on the bench, the cost-optimised positioning may be sufficient. In this scenario, the transition between the positioning modes may be made based on the position of the device (i.e. is the device on the court/rink or the bench) and so may be initiated by the positioning server or may be determined based on movement of the device (because players on the bench move less) and so may be device-initiated based on, for instance, data from an accelerometer included in the device.

As also mentioned previously, the system 1 may be used for tracking assets or people in a facility such as a shopping mall, factory, hospital, prison, warehouse etc. In such situations, the positioning mode may be selected, for example, based on data from a sensor (e.g. an accelerometer) in the trackable device (e.g. when a certain movement characteristic is low, cost-optimised positioning is sufficient but, when the movement characteristic is above a threshold, high accuracy positioning is more appropriate) or location (cost-optimised positioning may be sufficient in certain areas and high accuracy may be more appropriate in others).

Some further details of components and features of the above-described apparatuses and devices 10, 11A, 11B, 12, 13 and alternatives for them will now be described.

The controllers 100, 114, 116, 120, 130 of each of the apparatuses or devices 10, 11A, 11B, 12 comprise processing circuitry 1001, 1141, 1161, 1201, 1301 communicatively coupled with memory 1002, 1142, 1162, 1202, 1302. The memory 1002, 1142, 1162, 1202, 1302 has computer readable instructions 1002A, 1142A, 1162A, 1202A, 1302A stored thereon, which when executed by the processing circuitry 1001, 1141, 1161, 1201, 1301 causes the processing circuitry 1001, 1141, 1161, 1201, 1301 to cause performance of various ones of the operations described with reference to FIGS. 1 to 3. The controllers 100, 114, 116, 120, 130 may in some instance be referred to, in general terms, as "apparatus".

The processing circuitry 1001, 1141, 1161, 1201, 1301 of any of the apparatuses 10, 11A, 11B, 12, 1301 described with reference to FIGS. 1 to 3 may be of any suitable composition and may include one or more processors 1001A, 1141A, 1161A, 1201A, 1301A of any suitable type or suitable combination of types. For example, the processing circuitry 1001, 1141, 1161, 1201, 1301 may be a programmable processor that interprets computer program instructions 1002A, 1142A, 1162A, 1202A, 1302A and processes data. The processing circuitry 1001, 1141, 1161, 1201, 1301 may include plural programmable processors. Alternatively, the processing circuitry 1001, 1141, 1161, 1201, 1301 may be, for example, programmable hardware with embedded firmware. The processing circuitry 1001, 1141, 1161, 1201, 1301 may be termed processing means. The processing circuitry 1001, 1141, 1161, 1201, 1301 may alternatively or additionally include one or more Application Specific Integrated Circuits (ASICs). In some instances, processing circuitry 1001, 1141, 1161, 1201, 1301 may be referred to as computing apparatus.

The processing circuitry 1001, 1141, 1161, 1201, 1301 is coupled to the respective memory (or one or more storage devices) 1002, 1142, 1162, 1202, 1302 and is operable to read/write data to/from the memory 1002, 1142, 1162, 1202, 1302. The memory 1002, 1142, 1162, 1202, 1302 may comprise a single memory unit or a plurality of memory units, upon which the computer readable instructions (or code) 1002A, 1142A, 1162A, 1202A, 1302A is stored. For example, the memory 1002, 1142, 1162, 1202, 1302 may comprise both volatile memory and non-volatile memory. For example, the computer readable instructions 1002A, 1142A, 1162A, 1202A, 1302A may be stored in the non-volatile memory and may be executed by the processing circuitry 1001, 1141, 1161, 1201, 1301 using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 1002A, 1142A, 1162A, 1202A, 1302A may be pre-programmed into the apparatuses 10, 11A, 11B, 12, 13. Alternatively, the computer readable instructions 1002A, 1142A, 1162A, 1202A, 1302A may arrive at the apparatus 10, 11A, 11B, 12, 13 via an electromagnetic carrier signal or may be copied from a physical entity 14 (see FIG. 1) such as a computer program product, a memory device or a record medium such as a CD-ROM or DVD. The computer readable instructions 1002A, 1142A, 1162A, 1202A, 1302A may provide the logic and routines that enables the devices/apparatuses 10, 11A, 11B, 12, 13 to perform the functionality described above. The combination of computer-readable instructions stored on memory (of any of the types described above) may be referred to as a computer program product.

Where applicable, the BLE-capability of the apparatuses 10, 11A, 11B, 12, 13 may be provided by a single integrated circuit. It may alternatively be provided by a set of integrated circuits (i.e. a chipset). The BLE-capability may alternatively be a hardwired, application-specific integrated circuit (ASIC).

As will be appreciated, the apparatuses 10, 11A, 11B, 12, 13 described herein may include various hardware components which have may not been shown in the Figures. For instance, the trackable device 10 may in some implementations be a portable computing device such as a mobile telephone or a tablet computer and so may contain components commonly included in a device of the specific type. Similarly, the apparatuses 10, 11A, 11B, 12, 13 may comprise further optional software components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims. For instance, although the above examples have been described with reference to HAIP technology, it will be appreciated that the principles described herein are equally applicable to any positioning system which is capable of utilising both a first, higher accuracy positioning mode and a second, lower accuracy but less computationally demanding positioning mode.

The invention claimed is:

1. A method comprising:

causing a trackable device to transition between a first indoor positioning mode and a second indoor positioning mode in response to at least one of wireless receipt by the trackable device of a mode-transition control packet or a determination, based on data from a movement sensor included in the trackable device, that a condition with respect to movement of the trackable device is satisfied, wherein, in the first positioning mode, the trackable device causes wireless transmission via a Bluetooth Low Energy (BTLE) protocol of one or more data packets each including a data portion for enabling determination of a position of the trackable device via a plurality of antennas of a phased array of antennas of a locator device that are sequentially switched between a single BTLE receiver of the locator device, with a first resolution and, in the second positioning mode, the trackable device causes wireless transmission via the BTLE protocol of one or more data packets which do not include the data portion for enabling determination of the position of the trackable device, wherein the second positioning mode enables determination of the position of the trackable device via only one antenna of the plurality of the phased array of antennas and the single BTLE receiver of the locator device, with a second, lower resolution.

2. The method of claim 1, wherein data packets are transmitted by the trackable device with a higher frequency when in the first positioning mode than when in the second positioning mode.

3. The method of claim 1, further comprising:

modifying an interval between transmissions of radio frequency packets in response to receipt of the mode-transition control packet or in response to wireless receipt at the trackable device of a transmission-frequency control packet, wherein the mode-transition control packet or the transmission-frequency control packet indicates the interval to which the interval between transmissions should be modified.

4. The method of claim 1, comprising, prior to causing the transition between the first and second positioning modes, responding to receipt of a reception-frequency control packet by modifying an interval between reception time slots during which the trackable device listens for incoming control packets.

5. The method of claim 1 comprising responding to wireless receipt of a device-initiated-transition control packet by disabling an ability of the trackable device to transition between the first and second positioning modes in response to a determination based on data that is locally available to the trackable device.

6. A method comprising:

causing wireless transmission from a locator device to a trackable device of a mode-transition control packet for causing the trackable device to transition between a first indoor positioning mode and a second indoor positioning mode, wherein, in the first positioning mode, the trackable device wirelessly transmits via a Bluetooth Low Energy (BTLE) protocol one or more data packets including a data portion for enabling determination of a position of the trackable device via a plurality of antennas of a phased array of antennas of the locator device that are sequentially switched between a single BTLE receiver of the locator device, with a first resolution and, in the second positioning mode, the trackable device wirelessly transmits via the BTLE protocol one or more data packets which do not include the data portion for enabling determination of the position of the trackable device, wherein the second positioning mode enables determination of the position of the trackable device via only one antenna of the plurality of the phased array of antennas and the single BTLE receiver of the locator device, with a second, lower resolution.

7. Apparatus comprising:

at least one processor; and at least one memory including computer program code, which when executed by the at least one processor, causes the apparatus:

to cause a trackable device to transition between a first indoor positioning mode and a second indoor positioning mode in response to at least one of wireless receipt by the trackable device of a mode-transition control packet or a determination, based on data from a movement sensor included in the trackable device, that a condition with respect to movement of the trackable device is satisfied, wherein, in the first positioning mode, the trackable device causes wireless transmission via a Bluetooth Low Energy (BTLE) protocol of one or more data packets each including a data portion for enabling determination of a position of the trackable device via a plurality of antennas of a phased array of antennas of a locator device that are sequentially switched between a single BTLE receiver of the locator device, with a first resolution and, in the second positioning mode, the trackable device causes wireless transmission via the BTLE protocol of one or more data packets which do not include the data portion for enabling determination of the position of the trackable device, wherein the second positioning mode enables determination of the position of the trackable device via only one antenna of the plurality of the phased array of antennas and the single BTLE receiver of the locator device, with a second, lower resolution.

8. The apparatus of claim 7, wherein data packets are transmitted by the trackable device with a higher frequency when in the first positioning mode than when in the second positioning mode.

9. The apparatus of claim 7, wherein the computer program code, when executed by the at least one processor, causes the apparatus to modify an interval between transmissions of packets by the trackable device in response to receipt of the mode-transition control packet or in response to wireless receipt at the trackable device of a transmission-frequency control packet, wherein the mode-transition control packet or the transmission-frequency control packet indicates the interval to which the interval between transmissions transmission interval should be modified.

10. The apparatus of claim 7, wherein the computer program code, when executed by the at least one processor, causes the apparatus, prior to causing the transition between the first and second positioning modes, to respond to receipt of a reception-frequency control packet by modifying an interval between reception time slots during which the trackable device listens for incoming control packets.

11. The apparatus of claim 7, wherein the computer program code, when executed by the at least one processor, causes the apparatus to respond to wireless receipt of a device-initiated-transition control packet by disabling an ability of the trackable device to transition between the first and second positioning modes in response to a determination based on data that is locally available to the trackable device.

12. Apparatus comprising:

at least one processor; and at least one memory including computer program code, which when executed by the at least one processor, causes the apparatus:

to cause wireless transmission to a trackable device of a mode-transition control packet for causing the trackable device to transition between a first indoor positioning mode and a second indoor positioning mode, wherein, in the first positioning mode, the trackable device wirelessly transmits via a Bluetooth Low Energy (BTLE) protocol one or more data packets including a data portion for enabling determination of a position of the trackable device via a plurality of antennas of a phased array of antennas of a locator device that are sequentially switched between a single BTLE receiver of the locator device with a first resolution and, in the second positioning mode, the trackable device wirelessly transmits via the BTLE protocol one or more data packets which do not include the data portion for enabling determination of the position of the trackable device, wherein the second positioning mode enables determination of the position of the trackable device via only one antenna of the plurality of the phased array of antennas and the single BTLE receiver of the locator device, with a second, lower resolution.

13. A non-transitory computer-readable medium having computer-readable code stored thereon, the computer-readable code, when executed by a least one processor, causes performance of at least:

causing a trackable device to transition between a first indoor positioning mode and a second indoor positioning mode in response to at least one of wireless receipt by the trackable device of a mode-transition control packet or a determination, based on data from a movement sensor included in the trackable device, that a condition with respect to movement of the trackable device is satisfied, wherein, in the first positioning mode, the trackable device causes wireless transmission via a Bluetooth Low Energy (BTLE) protocol of one or more data packets each including a data portion for enabling determination of a position of the trackable device via a plurality of antennas of a phased array of antennas of a locator device that are sequentially switched between a single BTLE receiver of the locator device, with a first resolution and, in the second positioning mode, the trackable device causes wireless transmission via the BTLE protocol of one or more data packets which do not include the data portion for enabling determination of the position of the trackable device, wherein the second positioning mode enables determination of the position of the trackable device via only one antenna of the plurality of the phased array of antennas and the single BTLE receiver of the locator device, with a second, lower resolution.

* * * * *